United States Patent
Dodt

Patent Number: 5,839,761
Date of Patent: Nov. 24, 1998

[54] ARRANGEMENT FOR REDUCING TIRE/ROAD NOISE

[75] Inventor: Thomas Dodt, Hannover, Germany

[73] Assignee: Continental Aktiengesellschaft, Hannover, Germany

[21] Appl. No.: 569,663

[22] Filed: Dec. 8, 1995

[30] Foreign Application Priority Data

Dec. 8, 1994 [DE] Germany ............... 44 43 678.5

[51] Int. Cl.$^6$ .............. B62B 9/16; B32B 33/00; B32B 7/00
[52] U.S. Cl. .............. 280/851; 428/85; 442/262
[58] Field of Search .............. 280/847, 848, 280/851, 849, 852; 428/255, 262, 289, 304.4, 85, 97

[56] References Cited

U.S. PATENT DOCUMENTS

| | | | |
|---|---|---|---|
| 3,899,192 | 8/1975 | Reddaway | 280/851 |
| 4,013,302 | 3/1977 | Oswald | 280/851 |
| 4,598,000 | 7/1986 | Mantarro | 428/17 |
| 4,722,541 | 2/1988 | Gray et al. | 280/851 |
| 5,462,331 | 10/1995 | Stief et al. | 296/198 |
| 5,582,430 | 12/1996 | Bauer et al. | 280/851 |

FOREIGN PATENT DOCUMENTS

| | | |
|---|---|---|
| 3020849 | 12/1981 | Germany . |
| 3343402 | 6/1985 | Germany . |
| 4241518 | 2/1994 | Germany . |

OTHER PUBLICATIONS

European Union Guideline 91/226/EU Mar. 1991.

*Primary Examiner*—Brian L. Johnson
*Assistant Examiner*—Bridget Avery
*Attorney, Agent, or Firm*—Walter Ottesen

[57] ABSTRACT

An arrangement for reducing tire/road noise caused by a moving motor vehicle includes a spray water protective lining 3 in a wheel box 2 and/or a spray protective flap 41 mounted on the wheel box 2. The spray water protective lining 3 includes a composite layer structure which has at least one layer 17 for absorbing sound and at least one layer 11 for reducing spray mist.

11 Claims, 3 Drawing Sheets

ARRANGEMENT FOR REDUCING TIRE/ROAD NOISE

FIELD OF THE INVENTION

The invention relates to an arrangement for reducing tire/road noise caused by a moving motor vehicle.

BACKGROUND OF THE INVENTION

The tire/road noise of a moving motor vehicle constitutes a noise source. The primary radiation of acoustic power takes place in passenger automobiles in a frequency range from approximately 500 to 2,000 Hz and for truck tires, in a frequency range from approximately 400 to 1,220 Hz.

Published German patent application 3,020,849 discloses that sound shields can be provided on automobile tires which rotate with the tire. The action of the sound shield is dependent upon the geometric elevation of the shield. The greater the path is which the sound radiation is compelled to follow over the shield edge, the greater is also the reduction of noise. It is known to provide resonators on the shield edge in an arrangement of a sound shield. These resonators can be especially Helmholtz resonators.

The provision of separate sound shields is difficult and complex. Furthermore, when a curbstone is driven into, there is the risk that this sound shield can become damaged. The sound shields overall cause the wheel base to be wider. Furthermore, they define an unsuspended mass which must be specially balanced.

German Patent 4,241,518 discloses a covering attached in a wheel box of a motor vehicle. The covering is configured as a double-wall structure which is stable as to its form and includes a system of Helmholtz resonators. This known arrangement acts as a passive sound absorber and includes an outer shell which faces toward the wheel and a rear wall facing toward the wheel box. The walls of the double-wall structure comprise two form-stable and therefore rigid foils. The foil facing toward the wheel is subjected to dirt and this dirt can accumulate. This foil is also subjected to water which can freeze and also to snow. This causes the overall arrangement to lose its effectiveness as a sound absorber. The foil facing toward the wheel has a thickness which is three times the thickness of the foil facing away from the wheel. With this thickness change, it is intended that the durability of the overall sound absorption component be extended. A change of the effect is not given thereby.

Sound field experiments have been carried out and show that the sound absorption of this arrangement is not adequate. This is so because the arrangement is not effective in the near field of the main sound source.

SUMMARY OF THE INVENTION

It is an object of the invention to significantly reduce the tire/road noise emitted from a motor vehicle with the aid of an arrangement which is less complex.

The invention is an arrangement for reducing tire/road noise caused by a moving motor vehicle having a wheel box. The arrangement includes: an external spray water protective lining mounted in the wheel box or on a mud flap attached so as to be suspended from the wheel box; and, the lining being defined by a composite layer assembly including a layer component or structural component for absorbing sound.

The spray water protective system is present in close proximity to the rolling tire and is provided with effective measures for sound absorption. The radiated sound energy is absorbed to a significant extent whereby the noise level is reduced in the far field. In this context, advantageous use is made from the fact that spray protective arrangements on motor vehicles must be configured so that they are pulled very deeply in the direction of the roadway in accordance with European Union (EU) guidelines. In accordance with the EU guidelines, spray protective arrangements must be pulled down to a distance from the roadway of a maximum of 200 mm.

Spray water protective systems are set forth in EU guideline 91/226/EU of Mar. 27, 1991. According to this guideline, these arrangements are such that they prevent the atomization of water which has been thrown up by the rotating vehicle tires. Depending upon the case, the spray protective system comprises a wheel cover, a dirt collector and an apron having a spray protective arrangement. With the spray protective system, 70% of the eddied water is diverted away in a deliberate manner. The water appearing on the spray protective arrangement is brought to rest, collected and diverted away. This action is not disclosed in German Patent 4,241,518 wherein the arrangement has a smooth surface directed toward the wheel. Accordingly, when water is thrown up thereagainst, there is no absorption of the water energy possible. A reduction of spray mist is not the subject matter of German Patent 4,241,518.

According to another feature of the invention, the spray water protective lining has an external spray protective layer or spray protective plate which is configured so as to be permeable to sound and which covers the sound-absorbing layer or the sound-absorbing component. The first layer dissipates, on the one hand, the energy of the eddied water and is, on the other hand, configured so as to be permeable to sound. The first layer dissipates the energy with its special spray protective configuration, for example, with raster-like recesses having inclined walls. This first layer is so stable that the rearward-lying layers (especially the sound absorption layer) are not damaged because of thrown-up stones, rain, snow and ice. The second layer has the task of absorbing the noise which impinges thereupon.

In an advantageous embodiment of the invention, the sound absorbing layer comprises an absorber mat which is attached to a carrier plate or carrier layer defining a back wall of the composite layer structure. The absorber mat can comprise open-pore soft foam, fine metal wool, porous minerals or minerals made porous such as intensely foamed glass foam. Advantageously, the surface of the absorber mat facing toward the incoming radiation is covered by a thin sound-permeable protective layer.

In a further embodiment of the invention, the sound-absorbing component includes resonators and/or membrane absorbers. Helmholtz resonators can, for example, be provided as the resonators. The resonators can be provided so that they are stepped to different frequencies.

The spray protective layer can comprise a protruding mesh of plastic or metal wires.

It is furthermore advantageous that the spray protective layer is configured in two parts. The first part is a protruding mesh having an outer side covered by a second part defining a spray protective plate having open pores.

The production of such a system is significantly simplified when the rear wall of the spray protective layer or the rear wall of the spray protective plate defines the forward side of the sound absorbing component having the resonators. The spray protective layer or spray protective plate can be extruded or produced as a deep-drawn component. The wheel box can be produced in a conventional manner having connecting points and webs. Both parts are mutually inserted by means of a suitable mechanical connection and define the system wheel box having spray protection and sound protection.

If the lower side of the resonators faces the roadway and has openings, then, on the one hand, water which has penetrated, can be diverted away and, on the other hand, the resonators can operate via these openings with respect to grazing incident sound.

According to another feature of the invention, ancillary resonators on the lower side are effective with respect to grazing incident sound.

In an advantageous embodiment of the invention, the sound absorbers are matched to a frequency range from 500 Hz to 2,000 Hz for use in passenger automobiles and are matched to a frequency range from 400 Hz to 1,200 Hz for use in trucks. With this limitation to the relevant essentially effective frequency range, an optimal surface use of the mounting surface, which is available, is obtained for the resonators.

With the invention, the sound-reducing measures with respect to tire/roadway noise are integrated into the spray water protective arrangement of the motor vehicle in an advantageous manner. With one component, two different technical effects are thereby obtained. Furthermore, the noise-absorption arrangement is mounted so as to be protected by the acoustically permeable spray protective arrangement and is not subjected to the ambient.

Only by including the spray water protective arrangement is the possibility presented to position the sound-absorbing components adequately close to the main source of noise of the tires, namely, the roadway surface. In this way, a sound-absorbing arrangement is provided which, in its configuration, is better matched to the actual noise fields in the ambient or environment of the tire.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
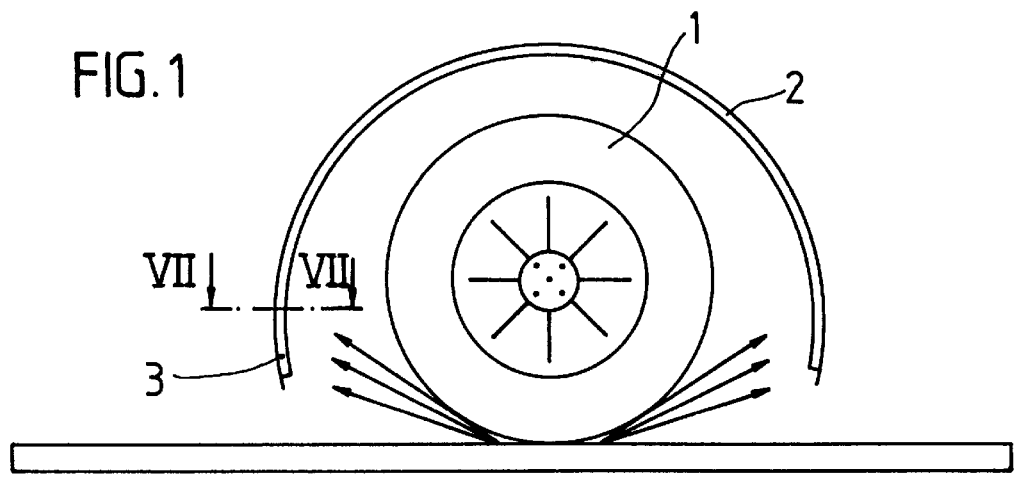
FIG. 1 is a schematic showing the configuration of a wheel box having a spray water protective lining.

In FIG. 1, a wheel 1 of a motor vehicle is shown schematically in side elevation view with a wheel box 2 mounted thereover. The primary radiation directions of the tire/roadway noise are indicated by two bundles of arrows. A spray water protective lining 3 is mounted in the interior of the wheel box 2 and has a composite layer structure as will be explained below.

Figure 2:
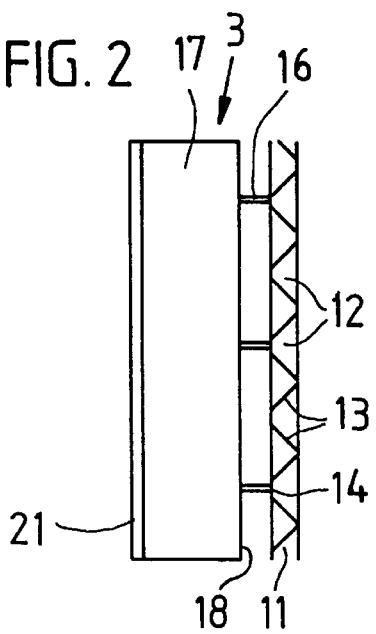
FIG. 2 is a schematic showing a composite layer structure of a spray water protective lining having a sound absorption layer.
Figure 3:
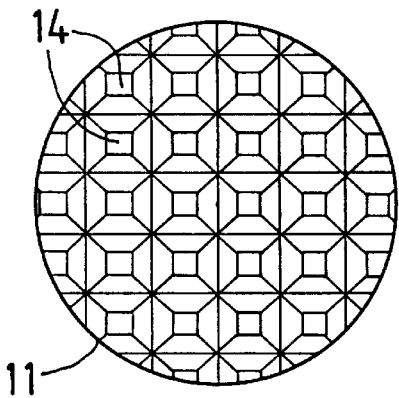
FIG. 3 is a plan view of the layer of the composite layer structure of FIG. 1, the layer being subjected to spray water and being configured as an open-pore spray protective plate.

The spray water protective lining 3 is shown in section in FIG. 2. The lining 3 is mounted in the wheel box 2 or on a spray protective flap (not shown) suspended behind the tire 1. The spray water protective lining 3 has a composite layer configuration. The top layer is an adequately stable spray protective plate 11 which reduces the spray mist, brakes thrown-up stones and protects the next layers against mechanical damage such as by stone impact. This impact resistant spray protective plate 11 is configured to be permeable to sound. The plate 11 includes a uniform roster (FIG. 3) of recesses 12 having inclined walls 13. The base 14 of each recess 12 is an opening. The configuration shown here is only one embodiment. The same effect can also be obtained with a similar symmetrical or non-symmetrical geometric configuration.

The spray protective plate 11 is connected in spaced relationship to the remaining composite layers via spacers 16. The second layer 17 is a sound-absorbing layer made of a porous mat of foam material which, for example, is an open-pore plastic foam of polyester, polyether or polyurethane. The absorber mat 17 is covered by a sound permeable thin protective layer 18 so that water is held away from the absorber mat 17. The water enters through the spray protective plate 11.

The third layer 21 of the composite layer configuration or structure defines a rear wall which is formed from a polymeric material or a metal material. This third layer 21 imparts the necessary mechanical strength to the entire composite layer structure and defines the connecting points for the attachment to the wheel box of the vehicle or to the spray protective flap.

Figure 4:
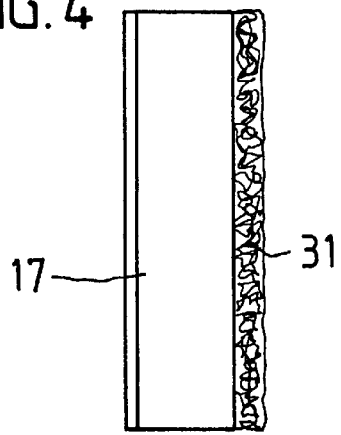
FIG. 4 is a composite layer structure having a protruding mesh of stable plastic filaments on the sound absorption layer.

The composite structure of FIG. 4 has a protruding mesh 31 as an outer spray protective layer. It is also possible to use carpet-like non-woven fabric, short fibers, woven fabric, knitted fabric or brush filaments. The mesh 31 is connected directly to the sound-absorbing layer 17 and is so stably configured that the rearward-lying sound absorption layer 17 is not damaged.

Figure 5:
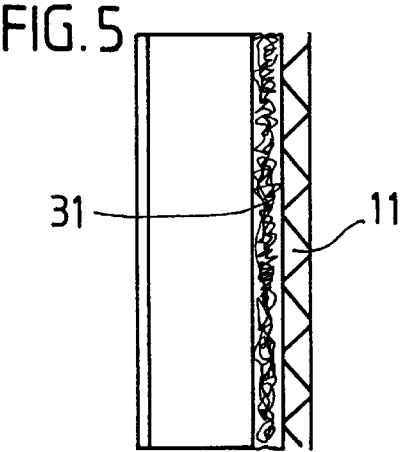
FIG. 5 is a schematic of a composite layer structure having a two part spray protective layer.

In the configuration of the composite layer structure of FIG. 5, the outer spray protective layer is comprised of two parts, namely, one very open plastic mesh 31 and the second part being a spray protective plate 11 mounted over the first part. The spray protective plate 11 is made of impact resistant plastic.

Figure 6:
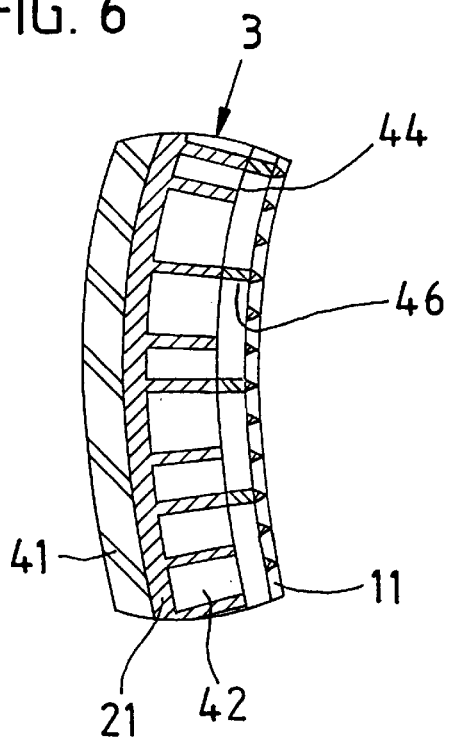
FIG. 6 shows a composite layer structure of a spray water protective lining having a sound absorption system in the form of resonators.

The composite layer structure of the spray water protective lining 3 of FIG. 6 is mounted on the elastomer material of a wheel box or spray protective flap 41. The rearward wall 21 is made of plastic or metal and supports a sound absorbing system 42 having resonators with resonator cavities defining openings. These openings are covered by a sound-permeable protective layer 44.

In a further embodiment, the wheel box or the spray protective flap 41 itself constitutes the rear side 21 of the resonators. An outer spray protective plate 11 is mounted spaced from the remaining composite layer structure via spacers 46. This spray protective plate is configured so as to be permeable to sound and provides protection against mechanical loads such as impacting stones.

Figure 7:
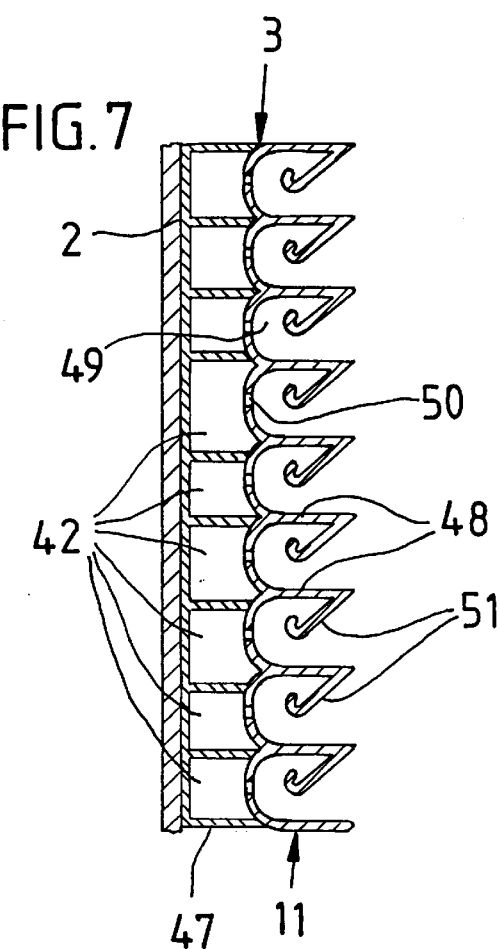
FIG. 7 is a spray water protective lining having a sound absorbing component having resonators.
Figure 10:
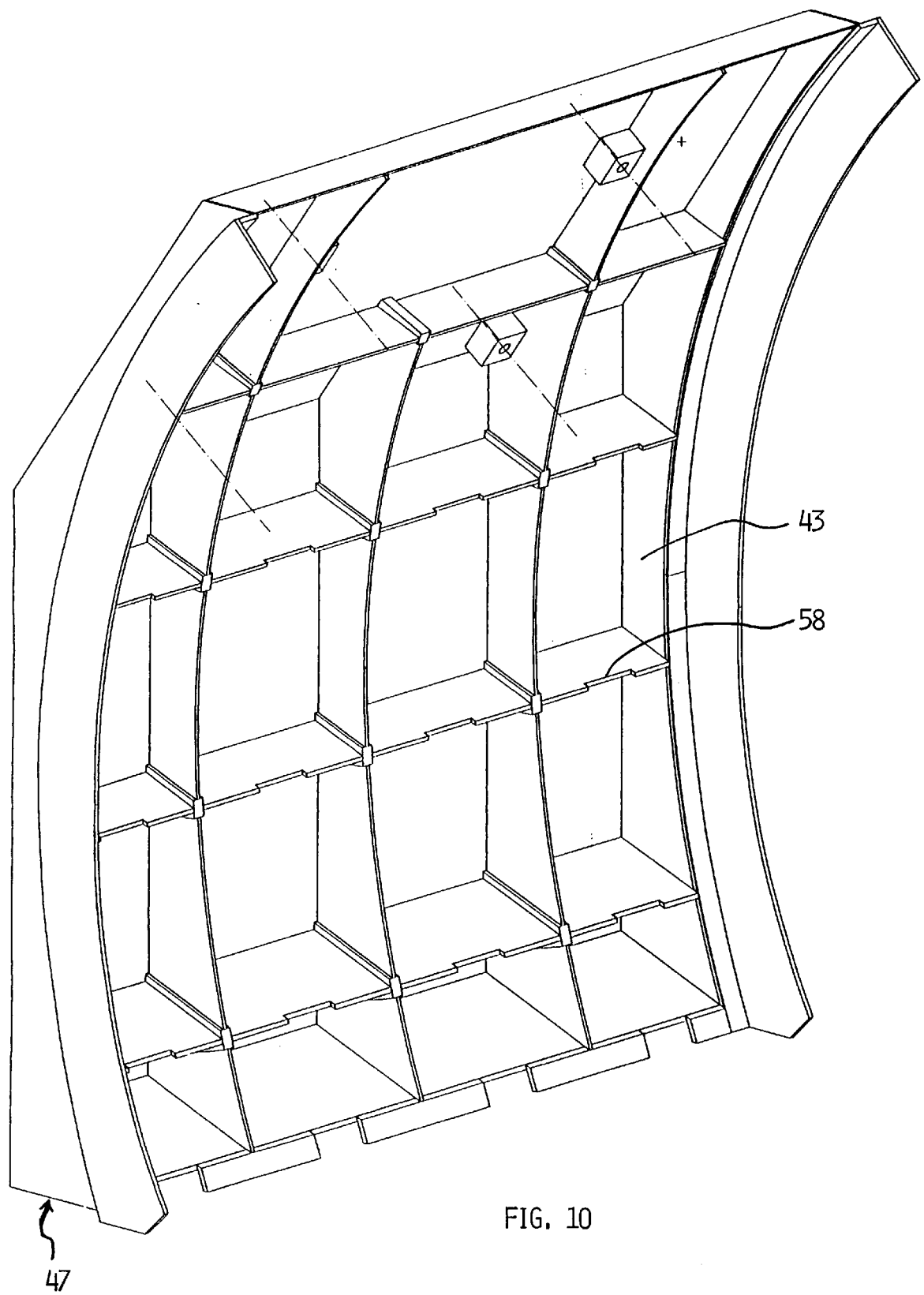

The composite layer structure of FIG. 7 includes a sound-absorbing component 47 which comprises resonators 42 arranged one next to the other. The resonator cavities 43 of the resonators 42 are shown in FIG. 10 where volume dimensions of the cavities are different for different frequencies. Slots 58 are provided to allow spray water entering the cavities 43 to drain.

The spray protective layer 11 lying above component 47 comprises an extruded plate having webs 48 arranged one next to the other. Openings such as bores or slits 50 are provided in the base between the webs 48. The openings are arranged in spaced relationship one next to the other and together with respective rearward volumes, define the resonators 42. The back wall of the spray protective layer 11 is therefore so configured that it simultaneously defines the forward side of the sound-absorbing component. A deflecting surface 51 extends inwardly from each of the web tips. The deflecting surfaces 51 cover the respective openings 50 of the resonators 42.

Figure 8:
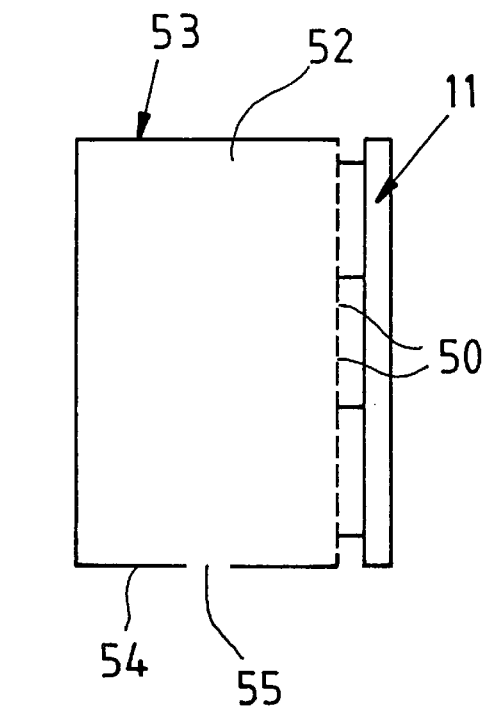
FIG. 8 is a schematic representation of the resonators of the sound absorbing component having a lower drain opening.

FIG. 8 shows a resonator arrangement 53 lying behind the spray protective layer 11. Each of the resonators 52 is provided in the lower side 54 facing toward the roadway with at least one opening 55 through which the water can be diverted away. This water penetrates via the resonator openings 50. On the other hand, the resonators 52 function as resonators for grazing incident sound, that is, sound traveling along the roadway.

Figure 9:
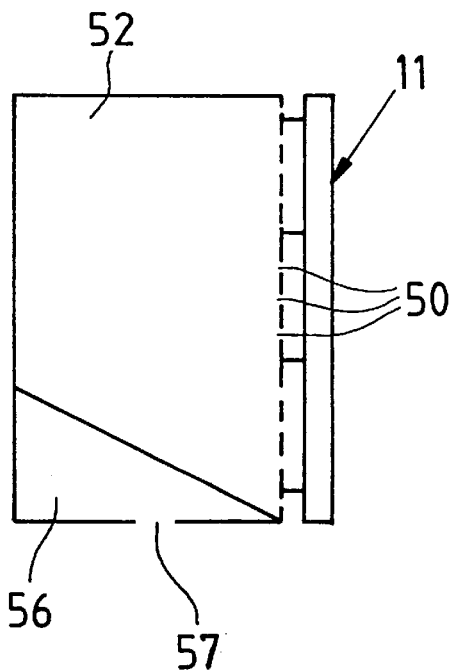
FIG. 9 shows the sound absorbing component having resonators and lower ancillary resonators; and, FIG. 10 is a perspective view showing the resonator cavities of the embodiment shown in FIG. 7.

In the embodiment of FIG. 9, ancillary resonators 56 can be mounted on the lower side of the resonators 52 so that they are separate from the resonators 52.

The resonators 52 are arranged so as to be mutually adjacent over the tire width and having a lower end facing toward the roadway. The resonators 52 have incident openings 50 directed in a first direction. A plurality of the separate or ancillary resonators 56 have incidence openings 57 directed in a second direction different from said first direction.

It is understood that the foregoing description is that of the preferred embodiments of the invention and that various changes and modifications may be made thereto without departing from the spirit and scope of the invention as defined in the appended claims.

What is claimed is:

1. An arrangement for reducing tire/road noise caused by a moving motor vehicle having a wheel box, the arrangement comprising:

an external spray water protective lining adapted to be mounted in said wheel box or on a mud flap attached so as to be suspended from said wheel box; and, said lining being defined by a composite layer assembly including:

a layer component for absorbing sound;

an outer mechanically stable spray protective plate adjacent said layer component so as to protectively cover said layer component and adapted to face the tire;

said protective plate defining a structural non-smooth, non-planar surface facing the tire for dissipating the energy of water thrown up from the road and for reducing spray mist and being made of an impact resistant material to protect said layer component from mechanical damage including damage from stones thrown up from the road; and, said protective plate having a plurality of through openings formed therein whereby said protective plate is permeable to road noise and water.

2. The arrangement of claim 1, further comprising a carrier plate defining a back wall of said composite layer assembly; and, the sound-absorbing layer component being an absorber mat attached to said carrier plate.

3. The arrangement of claim 1, further comprising a spatially expanded mesh, woven fabric, knitted fabric or non-woven fabric disposed between said layer component and said protective plate.

4. The arrangement of claim 1 further comprising spacer means interposed between said protective plate and said layer component for holding said protective plate in spaced relationship to said layer component whereby water penetrating said protective plate is kept away from said layer component and can run off toward the road.

5. An arrangement for reducing tire/road noise caused by a moving motor vehicle having a wheel box, the arrangement comprising:

an external spray water protective lining adapted to be mounted in said wheel box or on a mud flap attached so as to be suspended from said wheel box; and, said lining being defined by a composite layer assembly including:

a layer component for absorbing sound;

an outer mechanically stable spray protective plate adjacent said layer component so as to protectively cover said layer component and adapted to face the tire;

said protective plate defining a structural non-smooth surface and being impact resistant to protect said layer component from mechanical damage including damage from stones thrown up from the road;

said protective plate having a plurality of through openings formed therein whereby said protective plate is permeable to road noise; and, said protective plate having a plurality of cavities formed therein for defining said structured non-smooth surface and said through openings being formed in said protective plate in said cavities.

6. The arrangement of claim 5, each of said cavities having a base and each of said through openings being formed in corresponding ones of said bases.

7. An arrangement for reducing tire/road noise caused by moving motor vehicle having a wheel box, the arrangement comprising:

an external spray water protective lining adapted to be mounted in said wheel box or on a mud flap attached so as to be suspended from said wheel box; and, said lining being defined by a composite layer assembly including;

a layer component made of porous material for absorbing sound and adapted to face toward said wheel box or mud flap;

an outer mechanically stable spray protective plate adjacent said layer component so as to protectively cover said layer component and adapted to face the tire;

said protective plate defining a structural non-smooth surface and being made of impact resistant material to protect said layer component from mechanical damage including damage from stones thrown up from the road;

said protective plate having a plurality of through openings formed therein whereby said protective plate is permeable to road noise and to water thrown up from the road; and, a plurality of spacers interposed between said protective plate and said layer component for separating said protective plate from said layer component so as to define a clear space therebetween unobstructed except for said spacers whereby water is kept away from said layer component and can run off back to the road.

8. The arrangement of claim 7, said composite layer assembly further comprising a sound permeable protective layer directly covering said sound-absorbing layer component whereby water entering said clear space is prevented from reaching said sound-absorbing layer component.

9. The arrangement of claim 8, further comprising a carrier plate adapted to face the wheel box or mud flap; and, said sound-absorbing layer component being attached to said carrier plate.

10. The arrangement of claim 7, said protective plate having a plurality of cavities formed therein for defining said structured non-smooth surface and said through openings being formed in said protective plate in said cavities.

11. The arrangement of claim 10, each of said cavities having a base and each of said through openings being formed in corresponding ones of said bases.

* * * * *

UNITED STATES PATENT AND TRADEMARK OFFICE
CERTIFICATE OF CORRECTION

PATENT NO. : 5,839,761
DATED : November 24, 1998
INVENTOR(S) : Thomas Dodt

It is certified that error appears in the above-identified patent and that said Letters Patent is hereby corrected as shown below:

In column 4, line 16: delete "brakes" and substitute -- stops -- therefor.

In column 6, line 42: after "by", add -- a --.

In column 6, line 49: delete "including;" and substitute -- including: -- therefor.

Signed and Sealed this

Fourth Day of May, 1999

Attest:

Q. TODD DICKINSON

*Attesting Officer*  *Acting Commissioner of Patents and Trademarks*